United States Patent [19]

Cherry

[11] Patent Number: 4,845,349
[45] Date of Patent: Jul. 4, 1989

[54] BAR CODE SCANNER LASER EMISSION REDUCTION

[75] Inventor: Craig D. Cherry, Eugene, Oreg.

[73] Assignee: Spectra-Physics, Inc., San Jose, Calif.

[21] Appl. No.: 913,773

[22] Filed: Sep. 30, 1986

[51] Int. Cl.⁴ .............................................. G06K 7/10
[52] U.S. Cl. .................................... 235/462; 235/474
[58] Field of Search ............................... 235/462, 474

[56] References Cited

U.S. PATENT DOCUMENTS

| | | | |
|---|---|---|---|
| 4,210,802 | 7/1980 | Sakai | 235/462 |
| 4,431,912 | 2/1984 | Dickson et al. | 235/462 |
| 4,460,120 | 7/1984 | Shepard et al. | 235/462 |
| 4,467,196 | 8/1984 | Balliet et al. | 235/462 |
| 4,521,678 | 6/1985 | Winter | 235/462 |

Primary Examiner—A. D. Pellinen
Assistant Examiner—Jeffrey A. Gaffin
Attorney, Agent, or Firm—Donald C. Feix; Paul Davis; T. M. Freiburger

[57] ABSTRACT

An optical bar code reader using a light source which can be switched on quickly and includes provision for activating the light source and related devices only when data is actually being gathered, rather than wasting a large amount of beam on time and energy as in prior software based scanners.

10 Claims, 4 Drawing Sheets

BAR CODE SCANNER LASER EMISSION REDUCTION

BACKGROUND OF THE INVENTION

The invention relates to optical bar code readers, and more particularly to an improved scanner and decoder system wherein the light source is active substantially only when bar and space measurement data is being acquired.

In the prior art, bar code scanners using moving light beams had circuitry which operated the light beam and scanning mechanism independently of the decoding portions of the system. Some system implementations did not process data in real time, but used a two-step process of gathering data for a period of time, then decoding it. As a result, light energy in these prior systems was emitted for considerably greater periods of time than the decoder was active in collecting data. The total time in which the light beam was scanning could be twice or three times the useful data collection time.

It is among the objects of the present invention to improve over typical software-based scanner/decoder systems with a new method and system which can save one-half or even two-thirds of the beam activation time as compared with prior art systems. This is useful in requiring less power, which is particularly useful in battery powered systems. Another benefit is allowing use of higher peak light levels without increasing the amount of optical energy emitted, which is useful in laser systems in order to meet regulatory requirements for safety.

SUMMARY OF THE INVENTION

The present invention is a bar code reader system including provision for rapidly switching on the scanning light source upon activation of the scanning process (by the operator or an automatic item detector, for example). The light source will remain on during the period that bar/space measurements are being made, then will be switched off while an attempt is being made to decode the data. If a valid bar code was not found, the beam will again be switched on, data collected, the beam switched off, and the data decoded. This process may repeat until a good label is found, or until it is terminated by some other means (for example, by the operator releasing a trigger, or by a time limit being reached). A light source which can be switched on within a short period of time (a period of time on the same order as or shorter than the time required to attempt a decode) is required.

Other portions of the system related to the data acquisition process may be activated and deactivated in a similar manner. These may include a beam scanning mechanism or signal detection, amplification, filtering and processing circuit. Activation and deactivation of these other portions of the system may be offset in time from the activation or deactivation of the light source, but still controlled in like fashion.

Scanning systems using lasers, particularly laser diodes, are the best known implementation at this time. Benefits of reducing the total laser on time required to read a label include a possible increase in the peak emitted laser power, resulting in improved system performance, and a reduction in the total energy required to operate the system. Total laser energy emitted is limited by law for safety reasons, so it is useful to prevent laser emission during the periods when no data is being acquired.

Accordingly, in a preferred embodiment of the method of the invention, an optical bar code reading system is operated by activating the light source on occurrence of a signal that an item to be read may be present, collecting data potentially representing a bar code symbol, and then deactivating the light source while attempting to decode the data as a bar code symbol. Then if a bar code symbol was read, the method includes leaving the light source deactivated until the next item is to be read; otherwise repeating the process of activating the light source, collecting data, deactivating the light source, and attempting decode until either a bar code symbol is read, time limit is reached, or a signal occurs that an item is no longer available to be read.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTIONS OF THE DRAWINGS

FIG. 1 is a system block diagram generally indicating elements of an optical bar code reading system.

FIGS. 2A–2F collectively represent, schematically and in graph form, operation of various components and the corresponding signals generated versus time in a bar code reader, particularly a hand-held laser bar code reader.

DESCRIPTION OF PREFERRED EMBODIMENT

Figure 1:
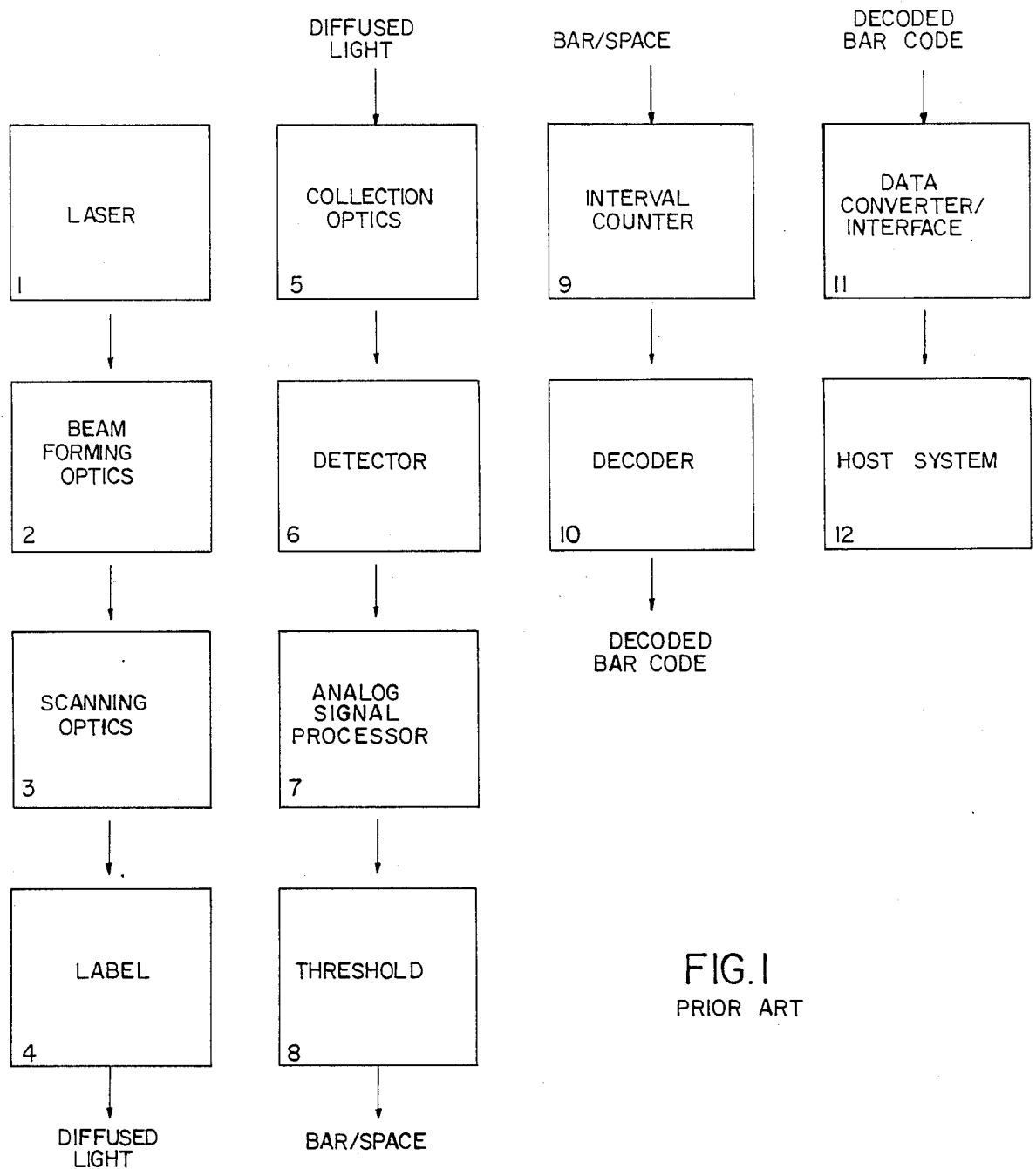

In the drawings, FIG. 1 indicates the general components involved in a bar code scanning system. The remaining figures indicate how the elements of FIG. 1 are controlled in accordance with the invention.

FIG. 1 shows typical elements of a bar code reader using a laser light source 1; beam forming optics to produce the desired optical characteristics in the outgoing light 2; scanning optics to direct the outgoing beam to form the desired scanning pattern 3, resulting in the reflection of diffused light from any bar code label 4 present in the area covered by the scanning pattern. The collection optics 5, in conjunction with the scanning optics 3, direct the collected diffused light onto the photodetector 6. The analog signal processor 7 and threshold circuits 8 process the detected light signal which varies with time as the scanning optics 3 direct the outgoing beam across the light and dark portions of the label 4, producing a signal indicating the transition of the scanning beam from light to dark or dark to light elements of the label. An interval counter 9 using a fixed rate clock produces a series of numbers, corresponding to the widths of the bars and spaces in the label, with the magnitude of each number representing the period of time needed for the scanning spot to cross the corresponding bar or space. These numbers are then processed by the decoder 10, which determines if they represent a valid bar code. If a bar code was found, the data converter/interface 11 sends the decoded bar code data from the scanner to the host system 12 for further processing as required by the application. In some system designs, the decoder 10 includes memory to store the raw scan data as it comes in at high speed. This data is then processed at lower speed, as described above. This provides an opportunity to turn off the scanning beam light source (shown as a laser in FIG. 1) during the time that the scan data is being decoded.

Figure 2:
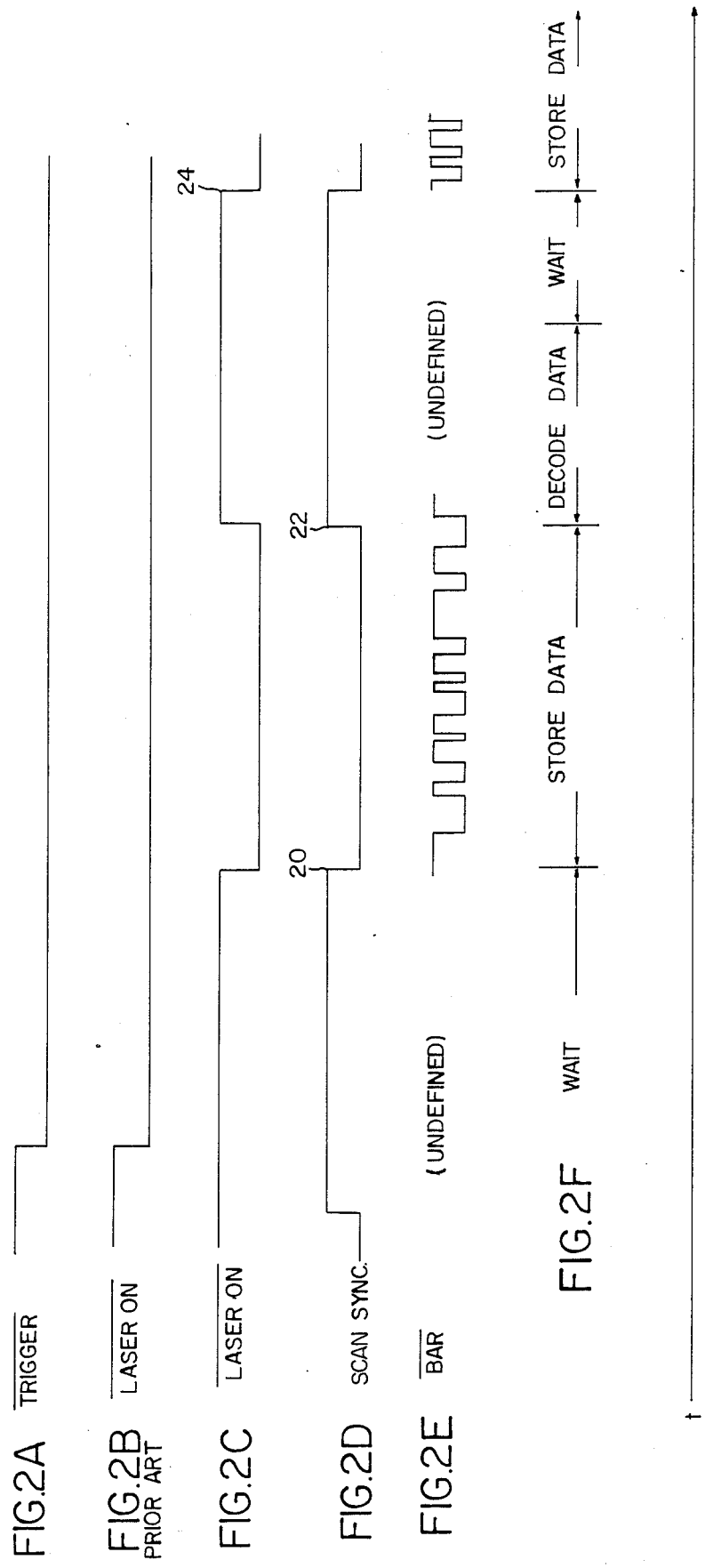

FIG. 2 is a schematic graphic representation with time as the horizontal axis and indicating the depression of the trigger in the case of a hand-held scanner; the laser on time according to prior art; the laser on time according to the invention; the occurrence of a signal indicating light and dark areas of a bar code, in the form of a digital signal after processing by the analog signal processor of the system and the threshold application as indicated in FIG. 1; and the scan signal as occurring with each reversal of direction of a dithering type scanner. In other words, the edges of the scan signal shown in FIG. 2 represent transition from one scan line to another or from one direction of movement to a reverse direction of movement in a single scan line pattern or completion of one scan of a complex pattern.

As indicated in FIG. 2, the trigger is depressed and during the period of time in which the trigger is depressed, the laser is generally on, at least in accordance with prior art practice. Thus, in the prior art, the laser would remain on not only through the completion of a first complete scan, i.e. between two edges 20 and 22 of the scan sync signal indicating that a single scan has been made, but beyond that point, while the microprocessor of such a prior system is decoding the bar signal, until it is determined whether or not a label has been read.

However, in accordance with the invention, the laser is shut off as soon as the second sync signal edge 22 is reached, and it remains off if a good read is made, or it is reenergized once the decoding logic of the microprocessor has determined that a good read has not been made, i.e. to the point in time 24 as indicated in FIG. 2.

Figure 3:
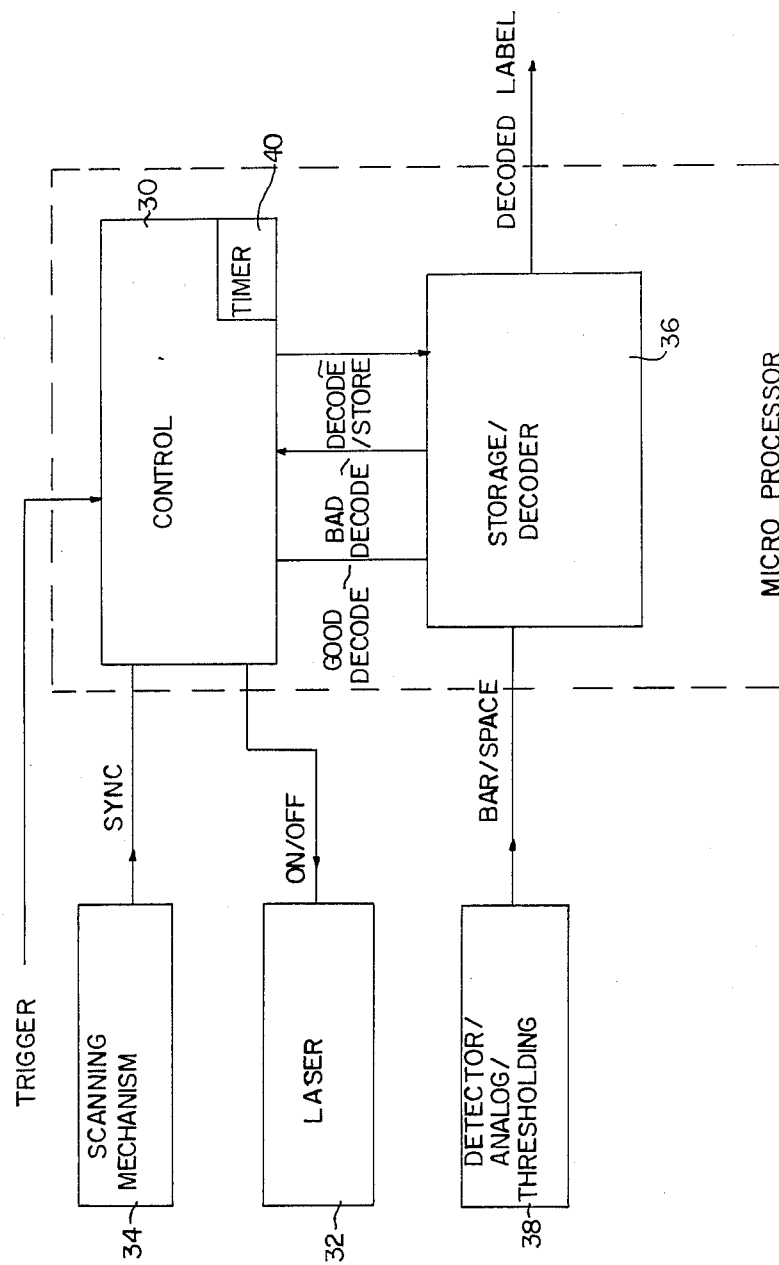
FIG. 3 is a block diagram indicating elements of a bar code reader in accordance with the invention, with control and signal transfer between several of the components.
Figure 4:
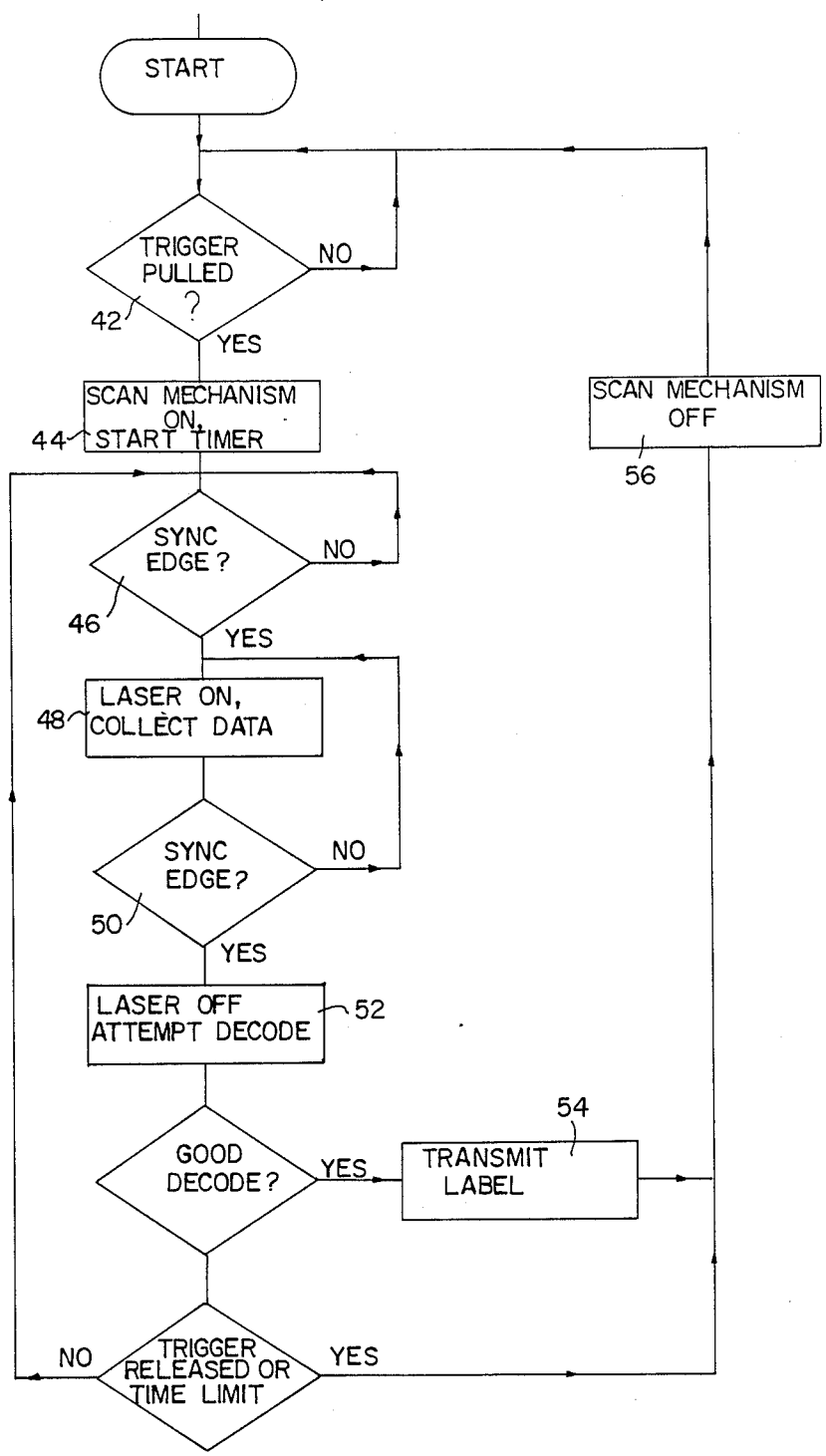
FIG. 4 is a flow chart indicating one preferred sequence of operation of the steps and components indicated in FIG. 3.

FIG. 3 shows a possible implementation of a bar code scanner as in FIG. 1 which is modified to use the method and system described above. A control mechanism 30 switches the light source 32 on and off in synchronism with the scanning mechanism 34 and storage and decoding of data passed to the decoder 36 by the detector and analog signal processing circuits 38. The scanning process is initiated by the operator activating a trigger as indicated in the drawing, and is halted by release of the trigger, successful decoding of a label, or by a timer 40 indicating that a predetermined time limit has been reached. FIG. 4 shows in flow chart form the sequence of events according to the invention for controlling the laser on time. Referring to both FIGS. 3 and 4, when the trigger is pulled on a hand-held scanner, the scan mechanism is turned on immediately (blocks 42, 44). When a first sync edge of the scanner is detected, as indicated in the first decision block 46 of the FIG. 4 diagram, the laser is turned on (block 48), which is similar to prior practice. The bar code reader begins collecting data.

Next, a second sync edge is detected (block 50), and the laser is shut off while the decoding logic attempts to decode the data collected (block 52). Data continues to be collected until the second sync edge is detected, as indicated in FIG. 4.

If a decode is made, the diagram of FIG. 4 indicates that the system transmits the label information (block 54) and the scan mechanism (and other operable components, if desired) is turned off (block 56) until such time as the trigger is released and depressed again.

However, if a good decode is not made, as indicated in FIG. 4, and the operator has not released the trigger and a preset time limit (for safety purposes) has not been reached, then the system again looks for a first sync edge (block 46) in the scanning of the beam and reiterates the process.

On the other hand, as indicated in the decision block 58 at the bottom of FIG. 4, if one of the trigger release or time limit events has occurred, then the scan mechanism and other components are turned off (block 56) and the system is deactivated until the operator again pulls the trigger.

The "laser off" block 52 indicates that the laser is turned off whenever the completion of a scan line has occurred. However, other power-drawing components can also be turned off at this point, including the scanner, providing the scanner is capable of rapid enough startup to still result in an effective operation and power saving.

It should be understood that even though this embodiment has been illustrated and described in connection with a hand-held scanner with a manual trigger, it could be implemented with other laser scan systems, such as those automatically triggered by passage of a product past a sensor.

While I have illustrated and described the preferred embodiment of my invention, it is to be understood that these are capable of variation and modification, and I therefore do not wish to be limited to the precise details set forth, but desire to avail myself of such changes and alterations as fall within the purview of the following claims.

I claim:

1. A method for operation of an optical bar code reading system having a laser light source, a means for activating the laser light source to produce a laser light beam, a decoder, and means for signaling presence of an item to read, so as to reduce on time of the laser beam to minimize laser emission and power requirements of the bar code reader system, within a scanning decoding/cycle, comprising:

activating the light source on occurrence of a signal that an item to be read may be present, collecting data potentially representing a bar code symbol, deactivating the laser source while attempting to decode the data as a bar code symbol, and if a bar code symbol was read, leaving the laser source deactivated until the next item is to be read; otherwise repeating the process of activating the laser source, collecting data, deactivating the laser source, and attempting decode until either a bar code symbol is read, a time limit is reached, or a signal occurs that an item is no longer available to be read.

2. The method according to claim 1, wherein the means for signaling presence of an item to be read is activated by a human operator via a control.

3. The method according to claim 1, wherein an automatic item detector signals the presence of an item to read.

4. The method according to claim 1, wherein the laser light source is a laser diode.

5. The method according to claim 1, wherein a scanning mechanism is used to scan the light beam, the mechanism being activated and deactivated at times determined by the activation and deactivation of the light beam.

6. The method according to claim 1, wherein signal detection, amplification, and filtering circuits are activated and deactivated at times determined by the activation and deactivation of the light beam.

7. In an optical bar code reading system having a laser light source, a decoder, and means for signaling presence of an item to read, the improvement comprising:

means for activating the laser source to produce a laser beam on occurrence of a signal that an item to be read may be present, means for collecting data potentially representing a bar code symbol, after occurrence of said signal that an item to be read may be present, means for deactivating the laser source after said data has been collected and while the decoder is active in attempting to decode the data as a bar code symbol, within a single scanning/decoding cycle, and means for leaving the laser source deactivated until the next item is to be read, if a bar code symbol was read; and otherwise for activating the laser source, collecting data, deactivating the laser source, and attempting decode repeatedly until either a bar code symbol is read, a time limit is reached, or a signal occurs that an item is no longer available to be read, whereby laser emission and power requirements of the system are minimized.

8. The improvement according to claim 7, wherein the means for signaling presence of an item to be read comprises a control operable by a human operator.

9. The improvement according to claim 8, wherein the laser light source is a laser diode.

10. The improvement according to claim 7, wherein the system includes a scanning mechanism for scanning the light beam and including means for activating and deactivating the mechanism at times determined by the activation and deactivation of the light beam.

* * * * *